United States Patent [19]

Gottschald

[11] Patent Number: 5,007,977
[45] Date of Patent: Apr. 16, 1991

[54] METHOD AND APPARATUS FOR APPLYING A STRIP TO THE PLANAR CONTOUR-PREPARED EDGE OF A ROTATING LENS

[75] Inventor: Lutz Gottschald, Am Meerbusch, Fed. Rep. of Germany

[73] Assignee: Wernicke & Co. GmbH, Düsseldorf, Fed. Rep. of Germany

[21] Appl. No.: 324,897

[22] Filed: Mar. 17, 1989

[30] Foreign Application Priority Data

Mar. 17, 1988 [DE] Fed. Rep. of Germany ....... 3808929

[51] Int. Cl.$^5$ ............................................. B32B 31/18
[52] U.S. Cl. .................................... 156/353; 156/252; 156/360; 156/446; 156/447; 156/456; 156/468; 156/474; 156/513; 156/522
[58] Field of Search ................. 156/64, 212, 215, 353, 156/360, 378, 446, 447, 456, 468, 475, 522, 552, 252, 253, 513; 350/409, 417

[56] References Cited

U.S. PATENT DOCUMENTS

| | | | |
|---|---|---|---|
| 3,553,049 | 1/1971 | Wolff | 156/456 |
| 3,874,974 | 4/1975 | Simmons | 156/353 |
| 4,242,162 | 12/1980 | Ronning et al. | 156/522 |
| 4,448,627 | 5/1984 | Satoh et al. | 156/446 |
| 4,707,208 | 11/1987 | Crumbach et al. | 156/212 |

FOREIGN PATENT DOCUMENTS 1237793  1/1969  United Kingdom .

OTHER PUBLICATIONS

"Allow for the Environment", Dec. 12, 1974, pp. 124–125, *Machine Design*.

*Primary Examiner*—Caleb Weston
*Attorney, Agent, or Firm*—Robert W. Becker & Associates

[57] ABSTRACT

A method and apparatus for applying a strip to the planar contour-prepared edge of a lens. The beginning of an endless strip is connected to the edge of a lens. A transverse perforation is introduced into the strip at a distance from the strip beginning that corresponds to the circumference of the lens. The lens is then rotated, and the strip is restrained, at a location thereof behind the perforation when viewed in the direction of movement of the strip, in such a way that the strip tears at the perforation to form a new strip beginning for the next lens. This new strip beginning is pressed against, and connected to, the edge of the next lens. A register is provided for determining the circumference of a lens.

8 Claims, 3 Drawing Sheets

METHOD AND APPARATUS FOR APPLYING A STRIP TO THE PLANAR CONTOUR-PREPARED EDGE OF A ROTATING LENS

BACKGROUND OF THE INVENTION

The present invention relates to a method and apparatus for applying a strip to the planar contour-prepared edge of a lens.

Great Britain Patent 1,237,793 Veyrat et al dated June 30, 1971 discloses a lens having a flexible peripheral strip, with the strip having a length that is greater than that of the lens periphery, as a result of which the ends of the strip overlap one another; the strip, in order to protect the edge of the lens from damage, is made of a resiliently yieldable material. The edge of the glass is provided with a profiling in order to hold the protective strip, which itself is profiled. Machine Design, Dec. 12, 1974, pages 124, 125, discloses resiliently mounting lenses or mirrors by providing them with a radially elastically resilient annular strip.

In contrast to this known art, it is an object of the present invention to provide a lens of the aforementioned general type where not only is the application of the peripheral strip facilitated, but rather a strip is achieved that is disposed exactly about the entire periphery, with the strip being connected to the edge of the lens, which describes a spherical curve.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
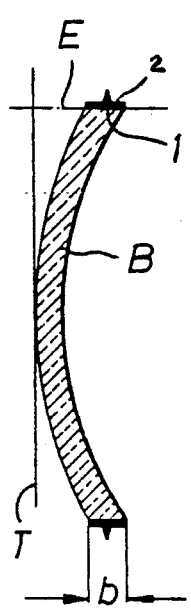
FIG. 1 is a vertical cross-sectional view through one exemplary embodiment of a lens to which a strip has been applied pursuant to the present invention.

The method of the present invention is characterized primarily by the steps of: connecting the beginning of an endless strip to the edge of the lens; introducing a transverse perforation into the strip at a distance from the beginning thereof that corresponds to the periphery or circumference of the lens; rotating the lens; restraining the strip, at a location thereof behind the perforation when viewed in the direction of movement of the strip, in such a way that the strip tears at the perforation to form a new strip beginning for the next lens; pressing the new strip beginning against, and connecting it to, the edge of the next lens; and repeating the previously recited steps.

The apparatus of the present invention is characterized primarily by a support means that includes a register for determining the peripheral length or circumference of a lens, a perforating mechanism for perforating the strip, a braking and arresting mechanism for the strip disposed between the perforating mechanism and the lens, and a guide roller for guiding the strip onto the lens, with the guide roller being disposed at a distance from the maximum expected lens periphery.

The advantage of the inventive method and apparatus is that, taking into consideration the various circumferences of lenses, especially for modern lens frames, a closed facet or a closed peripheral strip is always provided on the edge of the lens, with the measurement of the length of the circumference, and above all the jointless resting of the ends of the strips against one another, being improved. The inventive method and apparatus make it superfluous to have to grind a special peripheral shape, for example a facet, so that on the whole the manufacture of the lens can be effected more rapidly and more economically.

Further specific features of the present invention will be described in detail subsequently.

DESCRIPTION OF PREFERRED EMBODIMENTS

Referring now to the drawings in detail, the subsequently described lens is made of silica glass or plastic. The edge 1 of the lens is contoured, i.e. it has received its final shape. As can be seen, the plane E of the edge 1 of the lens is disposed perpendicular to the tangent line T at the front side of the lens.

Figure 2:
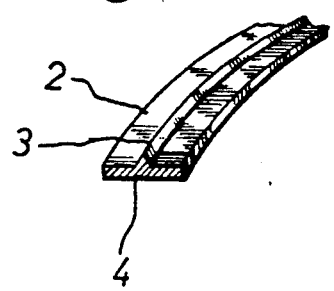
FIG. 2 is a perspective view of a portion of one exemplary embodiment of the inventive flexible material strip that has a facet.

A flexible band or strip 2 is to be applied to such an edge of the lens, and in particular by being glued or fused thereto or via laser technology. In the embodiment illustrated in FIGS. 1 and 2, the strip 2 has an outer portion 3 that has the shape of a facet with a gable-like cross-sectional configuration; the strip 2 also has a base portion 4 that has a band-like shape and is integral with the outer portion 3 that represents the facet. The width "a" of the base portion 4 (see FIG. 4) depends upon the narrowest width "b" of the lens edge 1: the width "a" of the strip 2 is preferably slightly less than the width "b" of the lens.

Figures 3, 4:
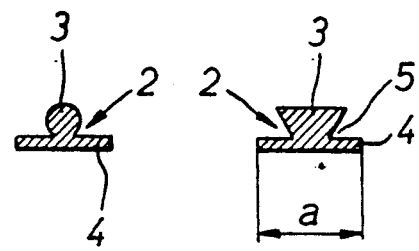
FIGS. 3 to 7 are partial cross-sectional views showing various exemplary embodiments of the flexible strip.
Figure 5:
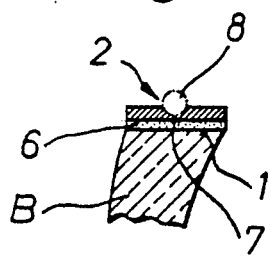

In the embodiment illustrated in FIG. 3, the outer or facet portion 3 of the strip 2 has a circular cross-sectional configuration, whereas in the embodiment illustrated in FIG. 4, the portion 3 has a trapezoidal cross-sectional configuration, whereby undercut regions 5 are formed In the embodiment illustrated in FIG. 5, the strip 2 has a rectangular cross-sectional configuration and is provided with a groove-like central longitudinal recess 7 that forms a negative facet and in which can be received a securing or fixing thread, wire, or other filament means 8.

Figures 6, 7:
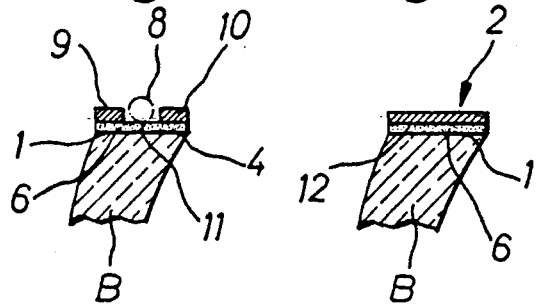
Figure 8:
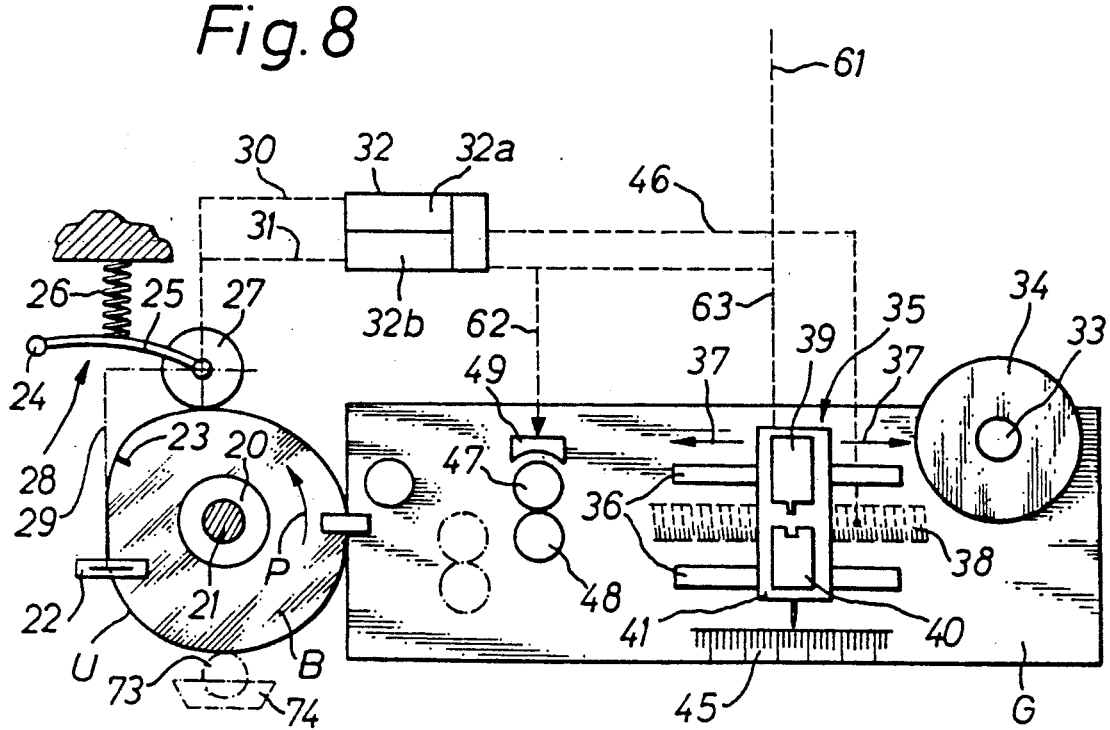
FIGS. 8 to 13 are views that show one exemplary embodiment of the apparatus of the present invention, including detailed features.

FIG. 6 shows an embodiment in which a thin, separate base portion 4 is provided upon which two ribs 9,10 are disposed on both sides of the longitudinal center of the base portion 4, with a gap 11 being left between the two ribs 9,10, with this gap 11 forming a groove for receiving a filament means 8. In certain cases, it is desirable to cover the lens edge 1, or to provide it with a colored layer, for example in the form of the band 12 in FIG. 7. The embodiment of FIG. 7 shows such a flat band 12 as having a rectangular cross-sectional configuration. In all of the illustrated embodiments, the strip 2 and the band 12 can be connected to the lens edge 1 at its base portion 4, i.e. with that side thereof that faces the lens edge, via an applied or separate self-adhesive layer 6. The strip or band can also be fused to the lens edge.

The method and overall apparatus for applying the strip 2 to the edge 1 of the lens B are described in conjunction with FIGS. 8 to 15. The lens B is held between two shaft halves 21 in a known manner by suction devices or blockers 20 that are disposed on the front and back sides of the lens; by means of the shaft halves 21, the lens can be rotated in the direction of the arrow P. At a suitable location, preferably at the location of the overall apparatus illustrated in FIGS. 8 and 9, a sensor 22 is disposed that is able to read a marking 23 that is temporarily provided on the lens B. A pivot lever 25 on a shaft 24 is provided on the overall apparatus to the side and above the rotatable lens. The pivot lever 25 is influenced by a spring 26, with the aid of which a roller 27 rolls on the periphery U of the lens B; the periphery of the roller 27 corresponds to the profile of the strip 2. The device 24 to 27 represents a counter or register 28 that is activated and deactivated by the sensor 22 when the lens has completed one revolution, i.e. the marking 23 has passed the sensor 22 twice (see line 29). The register 28 is connected via lines 30, 31 with a computer or storage means 32.

Disposed next to the lens B in the overall apparatus is a housing G or a frame in which the subsequently to be described components are disposed in, or approximately in, the horizontal plane of the half shaft 21. One of these components is a shaft 33 upon which is mounted a strip reel 34 from which are rolled off the portions that form the strip 2 on the lens. A perforating mechanism 35 is disposed between the shaft 33, with its reel 34, and the lens B; with the aid of one or two guide rails 36 that are disposed in the longitudinal direction of the housing G, the perforating mechanism 35 can be shifted in the direction of the arrows 37. This shifting can be effected manually or with the aid of a threaded spindle 38. The perforating components 39,40 are disposed on a frame, which can be shifted on the aforementioned guide rails 36, and form an upper die and a lower die. The lower die 40 can be fixed on the frame 41, while the upper die 39 can be moved up and down, so that a perforation of the strip 42 that is unwound from the reel 34 (FIGS. 9 and 11) is produced with separating cuts 43 and remaining connecting portions 44. The adjustment of the frame 41 can be effected manually with the aid of a scale 45 on the housing, for which purpose the visible value that was input into the computer or storage means 32 via the line 30 is used (see, for example, the exemplary value 18.6 shown in FIG. 9). Alternatively, the spindle 38 can be shifted longitudinally via the line 46 to the indicated value (here 18.6).

Disposed after the perforating mechanism 35 in the direction of travel of the strip 42 (see arrow K in FIG. 9) are the rollers 47,48 of a pair of rollers through which the strip 42 is guided and with which is associated a braking mechanism 49 that, when it becomes effective, instantaneously stops the rollers 47,48. The rollers 47,48 can be provided with an appropriate surface in order to instantaneously prevent the further transport of the strip 2 when the rollers are stopped.

Disposed at that end of the housing G that is adjacent to the lens B is a guide roller 50, the peripheral portion 51 of which that is adjacent to the lens B has a minimum spacing N (FIGS. 12 and 13) from the lens periphery where the guide roller 50 is closest to the lens. This spacing N can vary, which is not significant for the method and apparatus of the present invention.

Figure 10:
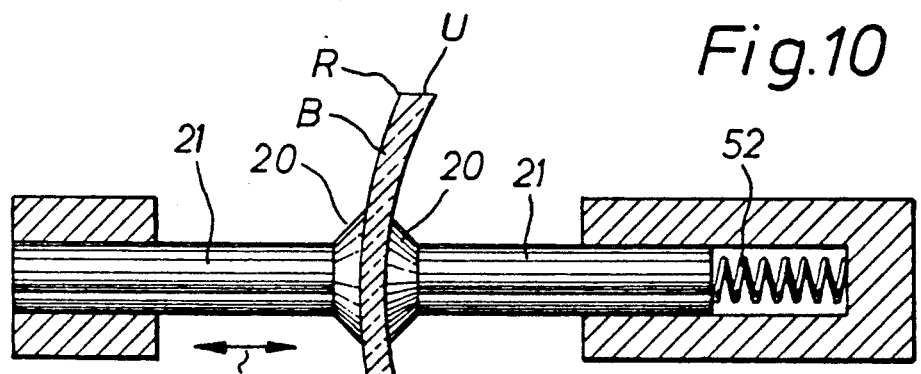
Figure 11:
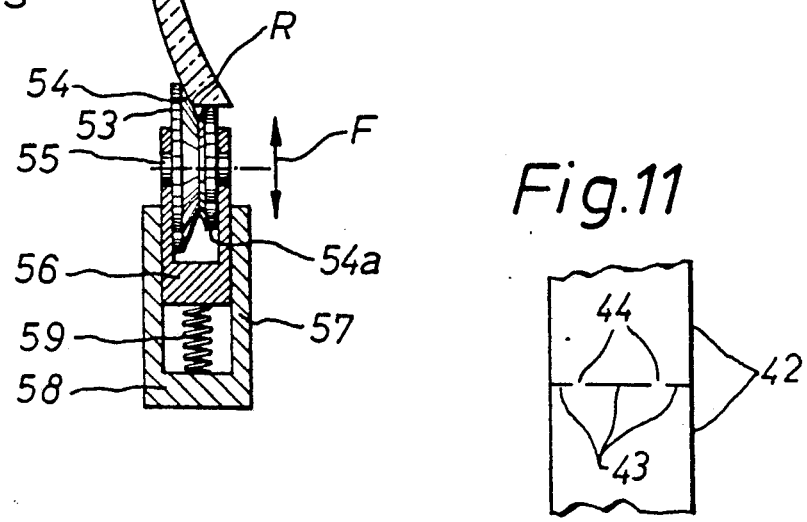

In order to obtain a uniform application of the strip 2 upon the lens B, the two shaft halves 21, along with the lens B, can be pressed with the aid of a spring 52 in the direction of the arrow S, so that the lens rim R is pressed against a wheel 53 that is provided with a profiling 54,54a and that can be rotated with the aid of a shaft 55. The shaft 55 itself is mounted on a pronged member 56 that is displaceable in a sleeve 57 on the housing G in the direction of the double arrow F (FIG. 10). A spring 59 that is disposed between the base of the pronged member 56 and the base 58 of the sleeve 57 assures that the grooved or profiled wheel 59 remains in contact against the periphery U of the lens B, whereby the rim R of the lens is pressed lightly against the edge of the profiling 54, so that the rim R of the lens always assumes the same axial position, regardless of the shape of the lens.

It is known to one skilled in the art to axially move a lens and a grinding wheel relative to one another, for example in order to cut a facet. Here too such a measure could be used in place of the axially fixed lens, with here the housing G or the lens B being adapted to be shifted axially.

Figure 14:

FIG. 14 illustrates the method of operation with a first lens. Block A represents a first stage where, with the aid of the marking 23 and the sensor 22 as well as the register 28, the peripheral length of the lens during one revolution is determined and from there is input via the line 30 into the computer or storage means 32, with this value appearing in the first window 32a thereof. Block B symbolically represents that, via the line 46 from the computer or storage means 32, the longitudinal adjustment of the frame 41 is effected via the threaded spindle 38. If no threaded spindle is used, the user can recognize, in the indicator 32a, the value to which he must shift the perforating mechanism 35 with the aid of the scale 45.

Block C represents the securement of the front end 60 of the strip 42 to the periphery U of the lens B approximately at the location 64 (FIG. 13), with the front end 60 being pressed against the periphery U in the direction of the arrow Z. Block D indicates that as the roller 27 is pressed against the periphery of the lens, at the same time via the lines 62, 63 a pulse is delivered to the perforating mechanism 35, so that the separating cuts 43 are generated. Now, as indicated by block E, the lens B can be rotated, with the register delivering its data to the portion 32b of the computer or storage means via the line 31. If the values of the portion 32a coincide with the values of the portion 32b of the computer or storage means 32, then after a complete revolution of the lens a pulse is delivered via the lines 62, 63 to the perforating mechanism 35 and to the braking mechanism 49 of the roller pair 47, 48. As a result, the strip 42 is temporarily and instantaneously stopped, and the portions 44 of the perforated strip 42 are torn, as indicated in FIG. 12 at the location 64 (block F).

After a lens of the same periphery or circumference has been inserted, for example the second lens of a spectacle frame (block G in FIG. 15), it is no longer necessary to effect a measurement of the length of the periphery, since this length is present in portion 32a of the computer or storage means.

Figure 12:
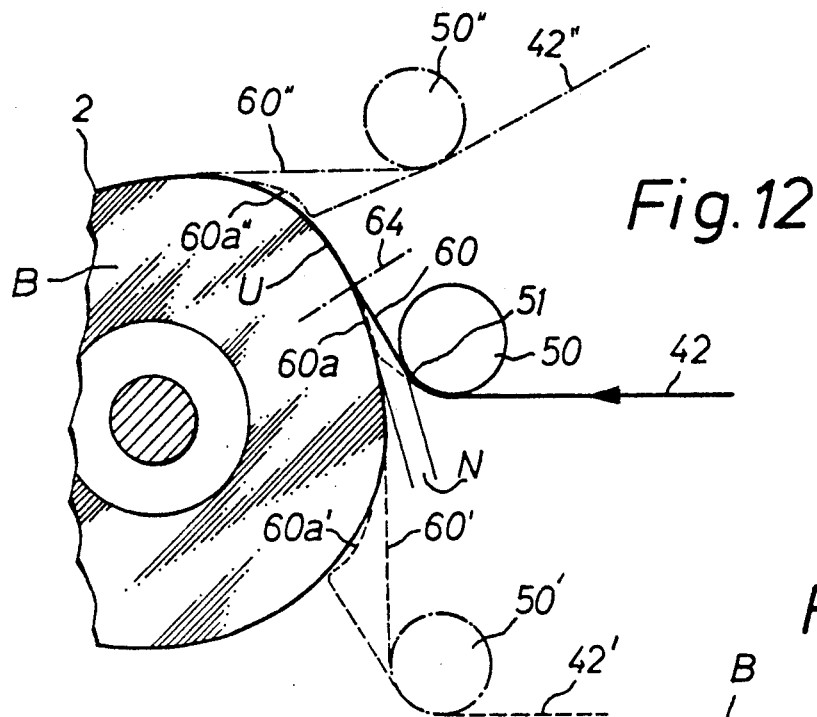
Figure 13:
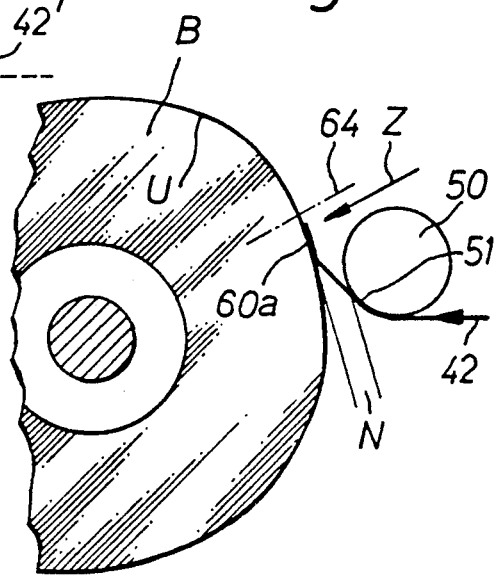
Figure 15:
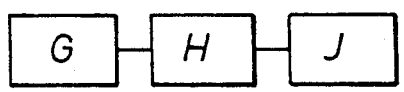
FIGS. 14 and 15 are views that show block diagrams of the method steps with a first lens and with an identical second or successive lenses.

The important feature of the present invention is that the start 60 of the strip for a successive lens is connected with the periphery U of the lens as a new strip portion 60a, as indicated in FIGS. 12 and 13, since this portion 60a, when the perforation of the strip 42 was torn at the location 64, was not yet connected to the lens, and therefore a deformation of the beginning 60 of the strip is possible in the manner illustrated in FIGS. 12 and 13. In order to connect the portion 60a to the periphery U of the lens over a greater length, the strip 42 can be guided into the position 42' and the beginning of the strip can receive the position 60a' in FIG. 12. Here again the beginning 60 of the strip is pressed against the periphery in the direction of the arrow Z, as shown in FIGS. 12 and 13 (block H in FIG. 15). If the lens is now rotated further (block J in FIG. 15), the register 28 follows the lens and, via the adjustment or balance in the computer or storage means 32, the perforating mechanism 35 and the braking mechanism 49 are again activated via the line 62, 63, so that the strip 42 is again torn at the perforated location and the end of the strip rests against the beginning of the strip on the lens in a jointless manner.

It is thus possible to place a new strip beginning on a lens that has the same peripheral length.

Figure 9:
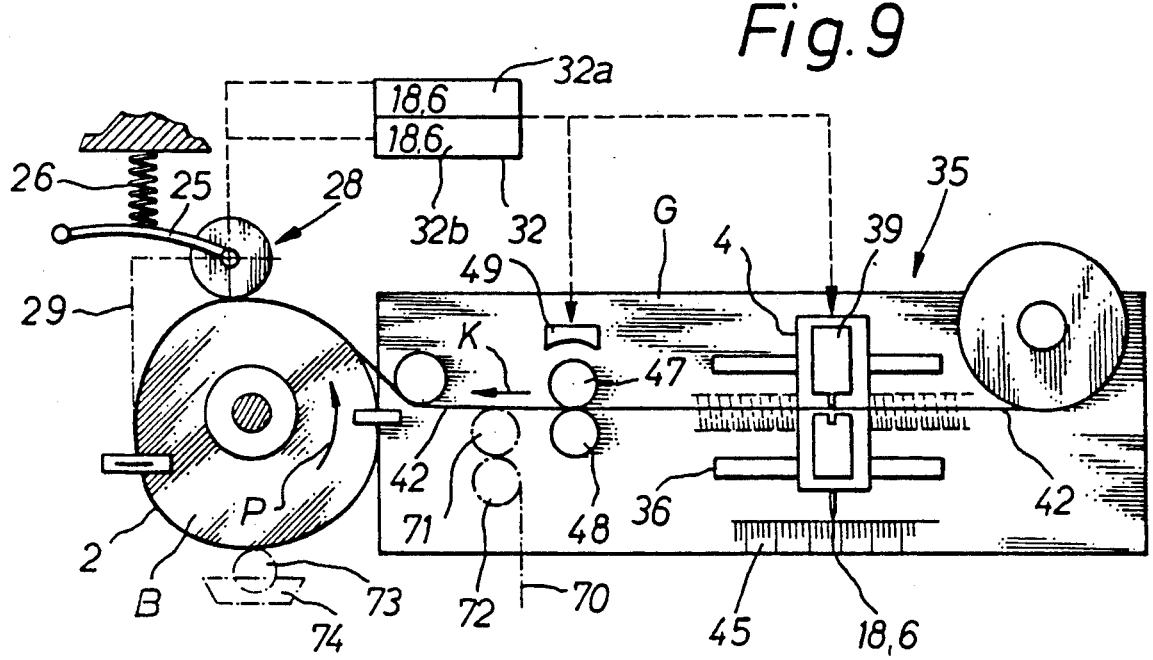

The positioning of the perforating mechanism be replaced by the input of the stored lens values into the portion 32a of the storage means, so that the operator merely has to carry out securement of the beginning of the strip to the lens, with the positioning of the perforating mechanism 35 also being automatically effected for the first lens. The further operation of the process corresponds to the sequence previously described When a self-adhesive strip is involved, the cover band 70 can be removed from the underside of the strip 42 via two rollers 71, 72 (FIG. 9). If the strip 2 is to be glued to the periphery U of the lens B, a roller 73, which extends into an adhesive container 74, can apply a thin adhesive layer. To fuse the strip to the lens, an appropriate device can be disposed shortly after the location 64.

Since measures for cutting strips in sheets to length via perforations and sudden stopping of the moved strips or sheets are known, this feature should enjoy the benefit of protection only in conjunction with the remaining described features, and especially with the manner in which the respective beginning of a strip, which initially is not connected with the preceding lens, is secured to the new lens.

For lenses where the diameter varies significantly, the frame or the housing can be displaceable in the longitudinal direction.

The present invention is, of course, in no way restricted to the specific disclosure of the specification and drawings, but also encompasses any modifications within the scope of the appended claims.

What I claim is:

1. An apparatus for applying a strip to the planar contour-prepared edge of a lens, comprising:
   support means for said lens;
   a register for determining the circumference of said lens;
   a perforating mechanism for perforating said strip;
   a braking and arresting mechanism, for said strip, disposed between said perforating mechanism and said lens; and
   a guide roller for guiding said strip onto said lens edge, with said guide roller being spaced from said lens.

2. An apparatus according to claim 1, which includes shaft means for said lens that are axially movable.

3. An apparatus according to claim 1, which includes shaft means for said lens and in which said perforating mechanism, said braking and arresting mechanism, and said guide roller, are movable parallel to said shaft means.

4. An apparatus according to claim 1, which includes means for adjusting the positions of said lens and perforating mechanism relative to one another.

5. An apparatus according to claim 4, which includes a storage means, and means for connecting said register to said perforating mechanism and said braking and arresting mechanism via said storage means.

6. An apparatus according to claim 5, which includes a sensor that is connected to said register for reading the periphery of said lens.

7. An apparatus according to claim 6, which includes means for longitudinally shifting said perforating mechanism, with said storage means being connected with said shifting means.

8. An apparatus according to claim 7, in which said shifting means is a worm shaft.

* * * * *